J. O. WALKER.
SAP CUP HOLDER.
APPLICATION FILED JUNE 13, 1916.

1,203,942.

Patented Nov. 7, 1916.

WITNESSES

INVENTOR
J. O. Walker
BY
ATTORNEYS

UNITED STATES PATENT OFFICE.

JAMES OLDHAM WALKER, OF PENSACOLA, FLORIDA.

SAP-CUP HOLDER.

1,203,942.　　　　Specification of Letters Patent.　　Patented Nov. 7, 1916.

Application filed June 13, 1916.　Serial No. 103,435.

*To all whom it may concern:*

Be it known that I, JAMES O. WALKER, a citizen of the United States, and a resident of Pensacola, in the county of Escambia and State of Florida, have invented a new and Improved Sap-Cup Holder, of which the following is a full, clear, and exact description.

Among the principal objects which the present invention has in view are: to provide suspension means for cups employed for collecting turpentine, which do not mar the tree when applied in service nor blemish the same by endangering the lumber-making tools if the tree is subsequently converted into lumber; to provide suspension means for cups of the character mentioned for holding the cups in close juxtaposition to the sap-gathering spouts, troughs or aprons used in conjunction therewith; and to provide a simple and efficient suspension device at reduced cost.

Figure 1:
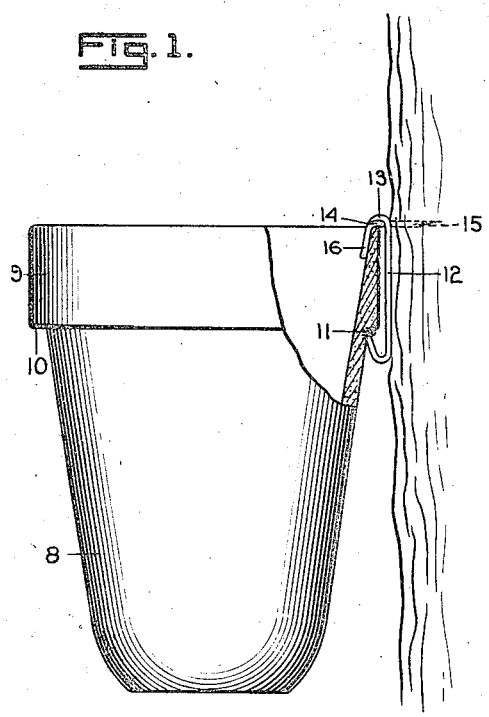
Figure 2:
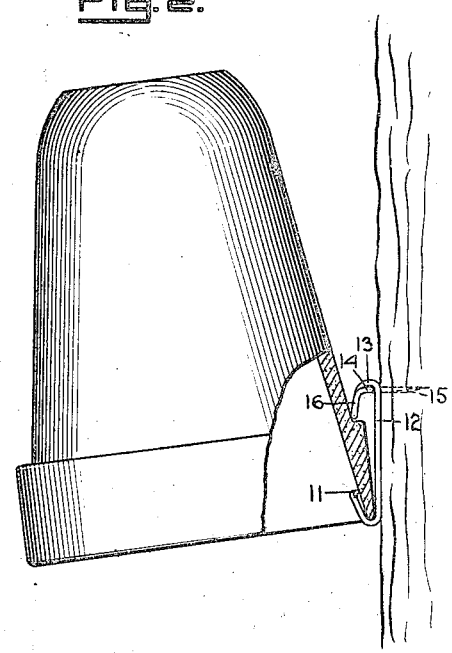
Figure 3:
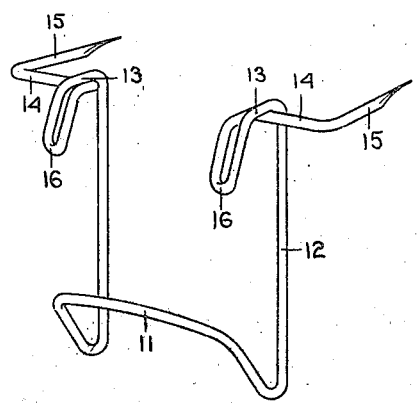

*Drawings.*—Figure 1 is an edge view of a supporter of the character mentioned, showing in conjunction therewith a sap cup, the cup being shown as actively disposed; Fig. 2 is a similar view showing the cup as inactively disposed; Fig. 3 is a detailed view in perspective of a holder constructed and arranged in accordance with the present invention.

*Description.*—As seen in the drawings, the cup 8 is of conventional form and construction, having adjacent the upper edge, a rim 9 arranged to form a shoulder 10. The shoulder 10, when in service, rests upon the cross bar 11 of the holder constructed and arranged in accordance with the present invention.

The holder above mentioned and as shown in Fig. 3 of the drawings has the bar 11 somewhat extended from and bridging the uprights 12. The uprights 12 are twisted to form loops 13 which extend above short bends 14 extended from the prick points 15 with which the holder is provided.

Intermediate the bends 14 and loops 13 on each upright 12, are former retaining hooks 16, which, as disclosed in Fig. 1 of the drawings, are disposed in service above and inside of the perimeter of the cup 8. Care is exercised when bending the wire of which the holder is composed, to insure that the loops 13 extend above the bends 14. By this expedient, distortion or opening of the bends of the wire is avoided. After a tree has been scored or blazed, the holders are placed in position, the points 15 being driven into the body of the tree. During the sap-collecting period, the holder remains in service position to be removed therefrom as soon as the sap-collecting period terminates. When the holder is removed from the tree, the points 15 are drawn and the holes formed thereby closed, which prevents any damage to the wood of the tree if later the tree is felled and converted into lumber. Damage to the mill saw in cutting lumber of this character is thus avoided. The damage referred to is occasioned by the fact that where nails or separable fastenings are employed, these are inadvertently left in the body of the tree, and when the tree is split or sawed into lumber, the saw is apt to be damaged by striking the obstructing nails.

It is obvious that the holders thus arranged may be constructed at slight cost.

One of the difficulties incident to the employment of cups and supporters therefor constructed and handled in conventional manner, is that during the dormant period or the period during which the sap is not flowing, the cups are preserved by packing or by disposing the same on the ground adjacent to the tree. If packed and stored, a large space is required, as the number of cups used on a plantation is great, sometimes running as high as five hundred thousand. When the cups are left on the ground exposed to the inclemency of the weather or to accidents of any nature, they become broken and when required for use are unfit and entail to the operator loss of time and inconvenience.

As shown in Fig. 2 of the drawings, one of the advantages of the present supporter is that the cup having the rim 9, may be inverted in the supporter. In this position, the cup is safe from the accidents referred to, and in large part spared from destruction by the operation of the weather.

Claim:

A holder as characterized comprising a double-ended single piece of wire, said wire being bent for forming a pendent portion, said portion embodying vertical uprights laterally disposed, and a cross bar connectting the same, and extended outward from the plane thereof, a plurality of retaining hooks formed from said wire adjacent the pointed ends thereof, said hooks being adapted to extend over and in front of the rim of a sap cup, and loops directly connected with said uprights and extending above the wire contiguous to said pointed ends, for preventing the opening of the bends of said wire when supporting the weight of said cup.

JAMES OLDHAM WALKER.